A. Winterburn,
Furnace Grate.
No. 2,078. Reissued Sep. 26, 1865.
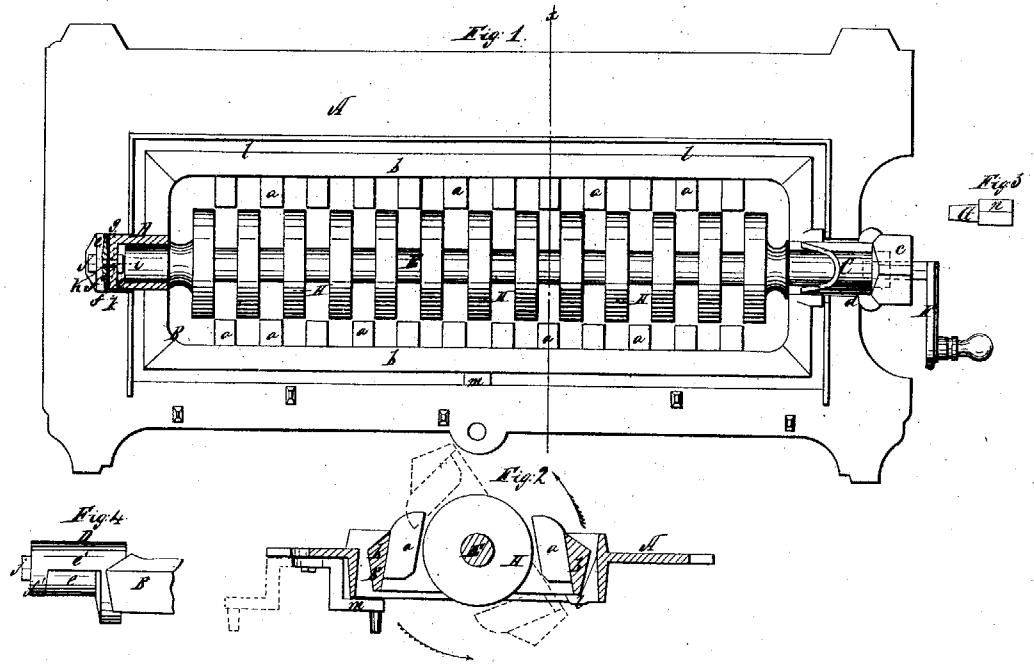
Witnesses:
G. W. Reynolds
G. W. Ruth
Inventor:
A. Winterburn
per Munn & Co
Attorneys
AM. PHOTO-LITHO. CO. N.Y. (OSBORNE'S PROCESS.)

UNITED STATES PATENT OFFICE.

ANDREW WINTERBURN, OF ALBANY, NEW YORK.

GRATE FOR FURNACES.

Specification forming part of Letters Patent No. 40,532, dated November 3, 1863; Reissue No. 2,078, dated September 26, 1865.

*To all whom it may concern:*

Be it known that I, ANDREW WINTERBURN, of the city and county of Albany, and State of New York, have invented a new and Improved Grate for Furnaces, Stoves, &c., for which Letters Patent were granted to me, dated November 3, 1863, and numbered 40,532, and which proving defective are now sought to be reissued; and I do hereby declare the following to be a full, clear, and exact description of my said invention, which will be more fully understood by reference to the accompanying drawings, in which—

Figure 1 is a plan or top veiw of my invention; Fig. 2, a transverse section thereof through the line *x x* of Fig 1. Fig. 3 is a detached view of a plug or pin pertaining to the same. Fig. 4 is a side view of the projections or journals of the dumping device.

To enable those skilled in the art to fully understand and construct this device, the following description will suffice.

A represents a cast-iron frame having a rectangular opening of sufficient capacity to receive the fire-grate.

B is a rectangular cast-iron frame corresponding in form with the opening in the frame A, and having teeth or projections *a a* at the inner surface of its parallel sides, as shown in Fig. 2.

C is a tubular bearing connected with the frame B. On its outer extremity is a shank, *c*, prepared to receive a winch by which the frame B may be rotated. At the other end of the frame B is another tubular bearing, D, formed in two parts, to facilitate the insertion and removal of the interior axis, E. This axis is provided with disks H, which I propose to make nearly circular in their circumferences. This form may, however, be much varied without any departure from the principle of my invention. The diameters of these disks should be about equal to the clear space between the row of teeth *a a* upon one side of the axis E and the corresponding row upon the other side of said axis. The thickness of the disks may be about equal to the spaces between these teeth *a a* in their respective rows. At one end of this axis E it has a square opening to receive the plug G. (Shown in Fig. 3.) This plug is connected with a crank, F, by which it may be worked when desirable. It is evident that instead of this square opening the axis E may project a little farther and be furnished with a shank made square externally to receive a winch by which it may be moved in the same way as is contemplated for the frame B, or the crank may be attached to the axis by a screw or other well-known device.

*l l* are lugs attached to the frame A, by which the frame B is prevented from turning in one direction. A button may be placed upon the other side of the frame A, so as to prevent the frame B from turning in the other direction, except when desired for dumping, as hereinafter described.

I propose to make the teeth *a a* extend a little higher than the frame B, to which they are attached; but this is not essential. I do not intend to limit myself to any particular shape or arrangement for these teeth. In fact, they may be omitted altogether without destroying the utility of my invention.

By turning the crank F the contents of the grate will be agitated, and the ashes will fall through between the disks H H and the teeth *a a*. This effect can be much increased by making the disks elliptical or polygonal, or by making them circular and placing them eccentrically with respect to the axis E.

When by the accumulation of incombustible material at the bottom of the grate the same becomes clogged, the button before mentioned may be turned in the proper manner and the frame B revolved backward, as shown in red lines in Fig. 2. By this means all the contents of the grate may be dumped into the ash-pit. This is the great end and aim of my invention. While I have a revolving agitator of the contents of the grate, I secure a convenient means of transferring to the ash-pit the substances which are too coarse to pass through the interstices of the bottom of the grate.

I am aware that flat dumping-beds for grates have been heretofore in use, and therefore do not claim dumping-beds, broadly.

I am also aware that cylindrical grate surfaces have been placed in the beds of grates for the purpose of agitating the contents thereof by means of the partial or entire revolution of such surfaces around their respective axes in substantially the same manner as the axis E and disks H H create agitation in my arrangement. I therefore make no claim to this contrivance by itself, but What I do claim as new, and desire to secure by Letters Patent, is—

1. A grate having in its bed a revolving axis with its appurtenances so contrived that by its revolution the contents of the grate shall be agitated, in combination with an extended bed so contrived and arranged that it can make a partial or entire revolution around its own axis, by which means the contents of the grate can be discharged into the ash-pit, substantially as and for the purpose described.

2. The axis E and disks H, in combination with the revolving frame B, constructed and operating substantially as and for purpose described.

ANDREW WINTERBURN.

Witnesses:

W. S. KELLEY,

FRANCIS H. WOODS.